Patented Sept. 29, 1942

2,297,564

UNITED STATES PATENT OFFICE 2,297,564

MANUFACTURE OF CHLORINATED ALIPHATIC HYDROCARBONS

Frederick William Kirkbride, Runcorn, England, assignor to Imperial Chemical Industries Limited, a corporation of Great Britain No Drawing. Application September 19, 1938, Serial No. 230,739
In Great Britain September 30, 1937

5 Claims. (Cl. 260—654)

This invention relates to the manufacture of novel chlorinated products, and particularly to the manufacture of highly chlorinated aliphatic hydrocarbons containing five carbon atoms.

It has been proposed to manufacture halogenated propenes by condensing a halogenated ethylene with a halogenated methane in the presence of a catalyst such as aluminium halide at temperatures not exceeding 20° C., e. g. it was proposed to make hexachlorpropene in this way from carbon tetrachloride and dichlorethylene, but this method has not hitherto been found useful to manufacture chlorinated hydrocarbons having five or more carbon atoms.

This invention has as an object to provide highly chlorinated aliphatic hydrocarbons having five or more carbon atoms. A further object is to provide a new method of manufacturing such chlorinated hydrocarbons. Further objects will appear hereinafter. These objects are accomplished by the following invention.

I have found that if carbon tetrachloride is reacted with dichlorethylene at a temperature between 45° C. and the boiling point of the mixture in the presence of a Friedel-Crafts catalyst, I can obtain chlorinated aliphatic hydrocarbons having five or more carbon atoms and that these chlorinated hydrocarbons can be still further chlorinated.

The condensation may be carried out using either cis- or trans-dichlorethylene though I prefer to use the former since reaction is more vigorous. Indeed when the cis-form is used I find that once the reaction has been initiated by heating to 40–50° C. the necessary elevated temperature can be maintained without further external heating, while when the trans-form is used this is not so, and some heat has to be applied throughout the reaction to maintain the necessary temperature.

However, I have not found that any differences result in the course of the reaction, for in both cases the main product, as identified by analysis and molecular refraction, is a heptachloramylene or a mixture of heptachloramylenes. A small proportion—about 20%—of a higher boiling residue is also obtained which on distillation under greatly reduced pressure yields a red, viscous oily liquid.

The condensation may be effected in the presence of about 1 to 5% of aluminium chloride, at any temperature between 45° C. and the boiling point of the reaction mixture, though in general I have found that temperatures of the order of 50–60° C. are most suitable, and under these circumstances reaction appears to be complete in about 4–5 hours. The catalyst can then be removed by decomposition with water or otherwise, and the chlorinated products dried and distilled to remove unchanged reactants. The product itself may also be split into fractions by distillation, e. g. distillation in vacuo.

The step of chlorinating the condensation products is performed by passing chlorine into the liquid products at an elevated temperature, e. g. 40–70° C. preferably in the presence of actinic radiation such as a mercury arc light. Chlorination catalysts such as ferric chloride, and solvents such as carbon tetrachloride or chloroform may also be employed. However I prefer to perform the clorination in the absence of either solvent or catalyst. Absorption of chlorine then occurs slowly but steadily for some days and finally highly chlorinated products result. Thus if heptachloramylene is obtained from the reaction products of the condensation and chlorinated in this manner a product is obtained which appears to be a mixture of nona- and decachlor-pentanes. The viscous red liquid isolated as the higher boiling residue from the condensation may also be chlorinated again when chlorohydrocarbons of the $C_5$ and $C_7$ series are obtained.

According to one form of my invention 3 molecular proportions of cis-dichlorethylene are mixed with 2–3 molecular proportions of carbon tetrachloride and heated to 50–60° C. in the presence of 1–2% by weight of anhydrous aluminium chloride, when reaction proceeds apparently in accordance with the equation:—

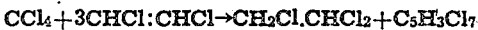

$$CCl_4 + 3CHCl:CHCl \rightarrow CH_2Cl.CHCl_2 + C_5H_3Cl_7$$

After heating for about four hours the reaction product is washed with water to remove the catalyst, and submitted to fractional distillation under reduced pressure, e. g. 40 mms. Hg. Trichlorethane and unchanged reactants (mainly the excess carbon tetrachloride) are soon distilled off, and then a colourless or pale yellow high boiling liquid distils over, leaving a certain amount of high boiling residue in the still. About 80–90% of the carbon tetrachloride consumed is converted to the high boiling liquid obtained, which analysis shows to be a heptachloramylene. Continued distillation under still lower pressure yields a red viscous liquid which on standing deposits crystals having an empirical formula $C_5Cl_8$.

In obtaining the further novel chlorinated products the distilled materials from the crude reaction product are heated to 50–60° and chlorine slowly passed in while the reactants are exposed to the light from a mercury arc. Absorption of chlorine slows down, notably after a few, e. g. 4 days. In the case of the heptachloramylene removal of dissolved chlorine and hydrochloric acid, e. g. by passing in dry nitrogen, suffices to give a clear colorless oil having a faint camphoric odour and a boiling point at ordinary pressures above 300° C.

The invention is illustrated but not limited by the following examples, in which the quantities are stated in parts by weight.

Example 1

100 parts of cis-dichlorethylene were mixed with 106 parts carbon tetrachloride and 3 parts of anhydrous aluminium chloride and heated to between 50 and 60° C. for four hours. After cooling the product was then washed with water and submitted to fractional distillation; after trichlorethane and unchanged carbon tetrachloride had been distilled off, 73 parts of a pale yellow liquid distilled over, leaving 18 parts of a high boiling residue in the still, which on standing deposited crystals having an empirical formula $C_5Cl_8$ and a melting point of 180.5° C.

The pale yellow liquid had a boiling point of 159–160° C. at 31 mm. pressure of mercury, and was converted on cooling to $-20°$ C. to a glassy mass. Its density ($D^{25}_4$ was 1.6746 grms. per ml. and its refractive index $D^{25}$ 1.5467.

Example 2

100 parts of the pale yellow liquid obtained as in Example 1 were heated to 50° C. and exposed to a mercury arc light while chlorine was passed in at a rate sufficient to maintain the liquid saturated with chlorine. After five days, introduction of chlorine was stopped and the mixture cooled to room temperature and thoroughly blown with dry nitrogen. 127 parts of a clear colourless oil were thus obtained which had a faint camphor-like odour. The density of the oil was 1.850/20° C. and its boiling point at ordinary pressures above 300° C.

Example 3

100 parts of cis-dichlorethylene were mixed with 106 parts of carbon tetrachloride and 3 parts of anhydrous aluminium chloride and heated to between 50 and 60° C. for four hours. After cooling the reaction product was then washed with water to remove the catalyst, dried, and the unchanged reactants distilled off. 50 parts of the product so obtained were then chlorinated in the presence of 1 part of powdered anhydrous ferric chloride by passing in chlorine at a rate sufficient to maintain saturation. During the chlorination the temperature was maintained at 80–90° C.

Absorption of chlorine ceased after 15 hours, and the increase in weight of the product after removing dissolved chlorine was 8 parts.

The catalyst was removed by filtration through moist lime when the product was obtained as a light brown viscous liquid which could be bleached to a pale yellow colour by treatment with 15% sodium hypochloride solution and then washing and drying.

Instead of the aluminium chloride used in Example 1 I could have used any Friedel-Crafts catalyst such as zinc chloride, ferric chloride, iron, or aluminium.

As many apparently widely different embodiments of this invention may be made without departing from the spirit and scope thereof, it is to be understood that the invention is not limited to the specific embodiments thereof, except as defined in the appended claims.

I claim:

1. A method of manufacturing chlorinated aliphatic hydrocarbons which have at least five carbon atoms which comprises reacting carbon tetrachloride with dichlorethylene in the presence of a Friedel-Crafts catalyst at a temperature between 45° C. and the boiling point of the reaction mixture.

2. A method of manufacturing chlorinated aliphatic hydrocarbons which have at least five carbon atoms which comprises reacting carbon tetrachloride with dichlorethylene in the presence of a Friedel-Crafts catalyst at a temperature between 45° C. and the boiling point of the reaction mixture and further chlorinating the resulting condensation product.

3. A method of manufacturing chlorinated aliphatic hydrocarbons which have at least five carbon atoms which comprises reacting carbon tetrachloride with dichlorethylene in the presence of a Friedel-Crafts catalyst at a temperature between 45° C. and the boiling point of the reaction mixture and further chlorinating the resulting condensation product by the action of chlorine in the presence of actinic radiation.

4. A method of manufacturing chlorinated aliphatic hydrocarbons which have at least five carbon atoms which comprises reacting carbon tetrachloride with dichlorethylene in the presence of a Friedel-Crafts catalyst at a temperature between 45° C. and the boiling point of the reaction mixture and further chlorinating the resulting condensation product by the action of chlorine in the presence of a chlorination catalyst.

5. A method as claimed in claim 3 in which the further chlorination is carried out in solution.

FREDERICK W. KIRKBRIDE.